US008560632B2

United States Patent
Kamga et al.

(10) Patent No.: US 8,560,632 B2
(45) Date of Patent: Oct. 15, 2013

(54) DEVICE FOR THE ADAPTIVE PROCESSING OF APPLICATION NOTIFICATIONS INTENDED FOR COMMUNICATION TERMINALS CONNECTED TO A TRANSMISSION INFRASTRUCTURE

(75) Inventors: Guy-Bertrand Kamga, Nozay (FR);
Stéphane Betge-Brezetz, Nozay (FR);
Sophie Piekarec, Nozay (FR);
Marie-Pascale Dupont, Nozay (FR)

(73) Assignee: Alcatel Lucent, Paris (FR)

( * ) Notice: Subject to any disclaimer, the term of this patent is extended or adjusted under 35 U.S.C. 154(b) by 252 days.

(21) Appl. No.: 12/678,355

(22) PCT Filed: Sep. 18, 2008

(86) PCT No.: PCT/FR2008/051680
§ 371 (c)(1),
(2), (4) Date: Jul. 12, 2010

(87) PCT Pub. No.: WO2009/047457
PCT Pub. Date: Apr. 16, 2009

(65) Prior Publication Data
US 2010/0312852 A1    Dec. 9, 2010

(30) Foreign Application Priority Data

Sep. 20, 2007    (FR) ...................................... 07 57701

(51) Int. Cl.
*G06F 15/16*    (2006.01)
*G06F 15/173*    (2006.01)
(52) U.S. Cl.
USPC ............ 709/217; 709/206; 709/207; 709/224
(58) Field of Classification Search
USPC ...................................................... 709/217
See application file for complete search history.

(56) References Cited

U.S. PATENT DOCUMENTS

| | | | |
|---|---|---|---|
| 7,653,734 B1* | 1/2010 | Aho | 709/231 |
| 2001/0053687 A1* | 12/2001 | Sivula | 455/412 |
| 2002/0026491 A1* | 2/2002 | Mason et al. | 709/207 |
| 2002/0156676 A1* | 10/2002 | Ahrens et al. | 705/14 |
| 2004/0030753 A1 | 2/2004 | Horvitz | |
| 2006/0085514 A1* | 4/2006 | Deen et al. | 709/206 |
| 2006/0242291 A1* | 10/2006 | Nevalainen | 709/224 |
| 2008/0063154 A1* | 3/2008 | Tamari et al. | 379/88.13 |
| 2009/0067419 A1* | 3/2009 | Araki | 370/389 |
| 2010/0235433 A1* | 9/2010 | Ansari et al. | 709/203 |

OTHER PUBLICATIONS

International Search Report.

* cited by examiner

*Primary Examiner* — Richard G Keehn
(74) *Attorney, Agent, or Firm* — Fay Sharpe LLP

(57) ABSTRACT

A device (D) is dedicated to the processing of application notifications that must be transmitted to users' communication terminals (TC) via at least one transmission infrastructure (RC). This device (D) comprises processing means (MT) configured, whenever an application notification intended for at least one user is received, to analyze that application notification so as to determine adaptation information which defines i) how and at what time that application notification's content must be transmitted to a chosen terminal (TC) of that recipient user, ii) what portion of the content must be used by that chosen terminal (TC), and iii) how that portion must be used by the chosen terminal (TC), depending on the chosen rule(s) and/or policy(-ies) and taking into account user and/or contextual information and/or the application notification's parameter(s) and/or characteristic(s) of the chosen terminal, and furthermore, to adapt the application notification to be transmitted based on the determined adaptation information.

18 Claims, 1 Drawing Sheet

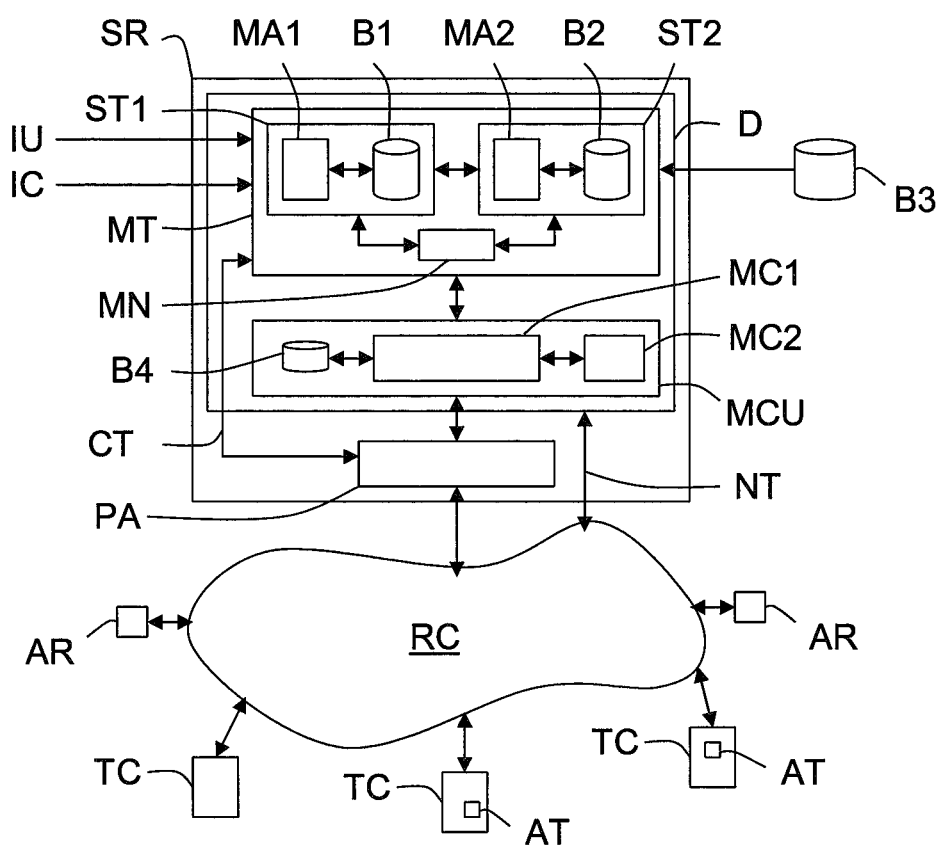

DEVICE FOR THE ADAPTIVE PROCESSING OF APPLICATION NOTIFICATIONS INTENDED FOR COMMUNICATION TERMINALS CONNECTED TO A TRANSMISSION INFRASTRUCTURE

This application is based on and claims the benefit of French Patent Application n° FR0757701 filed on Sep. 20, 2007, which is incorporated by reference herein in its entirety.

BACKGROUND OF THE INVENTION

The invention pertains to transmission infrastructures, and more specifically, the transmission of application notifications, coming from applications, to communication terminals connected to such transmission infrastructures.

Here, the term "transmission infrastructure" refers to both a communication network and to a broadcast network. Furthermore, here the term "broadcast network" refers to any type of terrestrial and/or satellite broadcast network capable of transmitting content, potentially multimedia, along a monodirectional downlink path to communication terminals. Furthermore, here the term "communication network" refers to any type of broadband, bidirectional communication infrastructure, whether wired, or wireless, particularly capable of transmitting content, potentially multimedia, to terminals, in "broadcast" mode and/or "multicast" (point-to-multipoint) mode, and/or "unicast" (point-to-point) mode.

Consequently, a transmission infrastructure may be a wired (or land-line) network, for example xDSL or fiber or cable, a T-DMB network, a satellite network, such as an SDMB (for "Satellite Digital Multimedia Broadcast") or S-UMTS or SDR ("Satellite Digital Radio") network, a radio-based terrestrial network, such as a mobile or cellular network (GSM, GPRS/EDGE, UMTS or CDMA2000, as well as all their variants and equivalents, including LTE ("Long Term Evolution")), or a DVB-H (for "Digital Video Broadcasting-Handhelds"-mobile television) network, or a terrestrial network implementing a technology derived from a satellite technology (such as DVB-S, DVB-S2 or DVB-RCS), or a wireless local area network (WLAN ("Wireless Local Area Network"—IEEE 802.11, Wi-Fi, ETSI HiperLAN/2), Bluetooth (IEEE 802.15), WiMAX (IEEE 802.16, ETSI HiperMAN) and Zigbee standards)), or a hybrid network, meaning one which is both satellite and terrestrial, such as a DVB-SH network (satellite links with terrestrial relays).

Finally, here the term "communication terminal" refers to any landline or mobile (or portable or cellular) communication device capable at least of to receiving content, potentially multimedia, from at least one transmission infrastructure (potentially a radio one), and potentially of transmitting content to other terminals. Consequently, it may, for example, be a landline or mobile (or cellular) telephone, (potentially an IP telephone), a desktop or portable computer, a personal digital assistant (or PDA), a "smartphone" (PDA combined with a mobile telephone), or a multimedia content receiver (for example, a decoder, a residential gateway, or an STB ("Set-Top Box")), provided that it is equipped with communication means, potentially radio or satellite means, capable (at least) of receiving content.

As is known to a person skilled in the art, there exist ever-greater numbers of applications needing to signal (or notify) to their end users, by means of application notifications, that an event has occurred or that new information or new content (potentially multimedia) are available to them. However, due to the great diversity in types of content (text, images, audio, video, data) and the great diversity in types of communication terminals, it is becoming increasingly difficult, if not nearly impossible, for an application to take into account both these diversities and criteria for providing content specific to the end users' terminals and/or to the end users themselves, such as information about the users (such as user profiles (preferences) and limitations on the use of content (such as due to a vision or hearing impairment)), contextual information, the notifications' parameters (such as the level of priority, the level of confidentiality, the level of criticality, or the semantics of the content to be transmitted), or the characteristics of the terminals (such as the supported content format, the supported save capacity, or the dimensions of the display screen, and similar ones).

In an attempt to improve the situation, several solutions have been proposed, such as the company IBM's smart notification service, the company MIR3's smart notification solution, and the solution called "Mobicall" from the company Newvoice. Unfortunately, these solutions are not satisfactory, because they only take into consideration a (very) small part of the criteria for providing content mentioned above. Specifically, the company IBM's smart notification service chiefly only takes into consideration the type of transmission channel preferred (instant messaging (or IM), e-mail, a telephone call, SMS, MMS, and similar ones), the user context (presence, availability, and location), and the notification's level of priority in order to determine the notification's transmission channel. In other words, the only question taken into consideration, and that only partially so, is that of the way ("how") to transmit a notification to an end terminal's user Furthermore, whenever a notification must be addressed to a group of end users, the notification may only be transmitted in parallel to all of the group's users. There is therefore no other transmission strategy for groups of end users.

Furthermore, the known solutions do not take into account adaptation criteria, such as the semantics of the content to be transmitted, the capacities (or characteristics) of the terminals, or the limitations of (or handicaps) of the end-users, nor all the different types of terminals.

SUMMARY OF THE INVENTION

The purpose of the invention is therefore to improve the situation.

To that end, it discloses a device dedicated to processing application notifications (coming from application(s)) which must be transmitted to (end) users' communication terminals via at least one transmission infrastructure, and comprising processing means tasked, whenever an application notification which is intended for at least one user is received, with analyzing that application notification in order to:
  determine adaptation information which defines i) how and at what time the application notification's content must be transmitted to a chosen terminal of that recipient user, ii) what portion of that content must be used by that chosen terminal, and iii) how that portion must be used by the chosen terminal, depending on the chosen rule(s) and/or policy(-ies) and taking into account user and/or contextual information and/or the application notification's parameter(s) and/or characteristic(s) of the chosen terminal, and
  adapting the application notification to be transmitted based on the determined adaptation information.

The inventive device may comprise other characteristics, which may is be taken separately or in combination, in particular:

its processing means may be tasked, whenever an application notification intended for a group of users is received, with analyzing that application notification in order to: determine adaptation information which defines i) how and at what time the application notification's content must be transmitted to terminals of the recipient users of that group, ii) what portion of that content must be used by these users' terminals, and iii) how that portion must be used by the users' terminals, depending on the chosen rule(s) and/or policy(-ies) and taking into account user and/or contextual information and/or the application notification's parameter(s) and/or characteristic(s) of the users' terminals and/or a role played by each user within the group, and adapting the application notification to be transmitted based on the determined adaptation information;

its processing means may be tasked with determining, whenever an application notification intended for a group of users is received, a piece of adaptation information which defines a mode for transmitting the application notification chosen from among (at least) simultaneous transmission, a full or restricted sequential transmission (depending, for example, on the role of each user in the group and/or the acknowledgment of the adapted application notification by one of the group's users (transmitting it to the next recipient user if and only if the previous one does not acknowledge the sent adapted application notification));

each piece of user information may, for example, be chosen from among (at least) the recipient user profile, the profile of the user who originated the application notification, and at least one limitation on content use related to the recipient user;

each piece of contextual information may, for example, relate to the recipient user and/or to the recipient user's chosen terminal, and may be chosen from among (at least) a piece of information relating to the presence of the recipient user near a terminal, a piece of information relating to the geographic position of the recipient user, a piece of information relating to the state in which each of the recipient user's terminals is found, and a piece of information relating to a piece of multimedia content currently being played by a terminal of the recipient user;

each parameter of the application notification may, for example, be chosen from among (at least) a level of priority, a level of confidentiality, a level of criticality, and a semantic of the content to be transmitted;

each terminal characteristic may, for example, be chosen from among at least a supported content format, a supported memorization capacity, and the display screen's dimensions;

its processing means may be tasked with choosing the terminal of the recipient user which is best suited for the content portion to be used;

its processing means may be tasked with choosing the moment which is best suited for the transmission of the application notification from among (at least) immediate transmission, transmission delayed until the end of the playing of a piece of multimedia content by a terminal of the recipient user, and transmission delayed until a chosen moment during the playing of a piece of multimedia content by a terminal of the recipient user;

its processing means may be tasked, whenever an application notification is received in which at least one parameter defining the term(s) of use of at least one portion of its content is missing, of i) determining each missing definition parameter depending on its other parameters and chosen rule(s) and/or policy(-ies) and taking into account user and/or contextual information and/or the application notification's parameter(s) and/or characteristic(s) of the chosen terminal, and ii) adapting the application notification to be transmitted by adding to it each determined definition parameter;

each term of use for a content portion may, for example, be chosen from among (at least) a momentary interruption in the playing of a piece of multimedia content in order to use the determined content portion, a text-to-sound conversion of the determined content portion, a sound-to-text conversion of said determined content portion, a conversion from a first language into a second one, and issuing an audible alert signal upon the reception of the adapted application notification;

its processing means may be tasked with adapting each application notification depending on the application upon which it depends and/or on each type of transmission infrastructure used to transmit it to each recipient user;

it may comprise control means tasked with i) applying adaptation decisions made by the processing means, ii) delivering the application notifications adapted by the processing means to the terminals, iii) ensuring that the adapted application notifications have indeed been transmitted to the recipient terminals, and iv) ensuring that these terminals have used the contents of the adapted application notifications in accordance with the terms of use defined by their parameters;

the control means may also be tasked with storing within a storage means all the adapted application notifications sent and/or to be sent to the terminals;

the control means may also be tasked with managing at least one interactive operation triggered within a chosen terminal subsequent to the use of a portion of an adapted application notification's content.

The invention also discloses a server intended to form part of a communication network's services platform, and equipped with a processing device of the sort described above.

Other characteristics and advantages of the invention will become apparent upon examining the detailed description below, and the attached drawing in which the sole FIGURE schematically and functionally illustrates a server connected to a communication network and equipped with an example embodiment of an inventive processing device. The drawing may serve not only to complete the invention, but also to contribute to defining it, if need be.

The object of the invention is to enable the adaptation of application notifications which are intended for communication terminals connected to at least one content transmission infrastructure, potentially multimedia content, in the presence of a diversity of content types, a diversity of communication terminal types, and a diversity of criteria for providing content and/or a diversity of contextual information and/or a diversity of application notification parameters and/or a diversity of terminal characteristics.

In what follows, it is assumed by way of a nonlimiting example that the transmission infrastructure (RC) is a mobile (or cellular) communication network, for example a UMTS (or LTE) or CDMA2000 network. However, the invention is not limited to this type of transmission infrastructure. Rather, it pertains to both communication networks (whether wired or wireless) and to broadcast networks (whether wired or wireless). Consequently, it may also be a terrestrial and/or satellite mono-directional broadcast network, or a wired (or land-line) network, such as an xDSL or fiber or cable network, or a T-DMB network, or a satellite network, such as an SDMB (for "Satellite Digital Multimedia Broadcast") or S-UMTS or SDR ("Satellite Digital Radio") network, or a wireless local area network (WLAN ("Wireless Local Area Network"-IEEE 802.11, Wi-Fi, ETSI HiperLAN/2), Bluetooth (IEEE 802.15), WiMAX (IEEE 802.16, ETSI HiperMAN) and Zigbee standards)), or a hybrid network, meaning one that is both satellite and terrestrial, such as a DVB-SH network (satellite links with terrestrial relays).

It should be noted that the invention pertains to any type of communication terminal (TC), whether land-line or mobile (or portable or cellular) that can connect to at least one transmission infrastructure (potentially a radio-based one) in order, at least, to receive content, potentially multimedia content, from that transmission infrastructure. Consequently, the communication terminals (TC) may be landline or mobile (or cellular) telephones (potentially IP telephones), smartphones, desktop or portable computers, personal digital assistants (or PDAs), multimedia content receivers (for example, decoders, residential gateways, or STBs ("Set-Top Boxes")), provided that they are equipped with communication means, potentially radio or satellite means, capable (at least) of receiving content.

BRIEF DESCRIPTION OF THE DRAWING

The sole FIGURE schematically and functionally depicts a communication network (RC), here a mobile network (by way of example), to which are connected (communication) terminals TC of different types, as well as a server SR dedicated to controlling the provisioning of application notifications to terminals TC as well as to controlling the use of said application notifications by these terminals TC. It should be noted that, although not depicted, the server SR may form part of a services platform.

DETAILED DESCRIPTION OF EMBODIMENTS

As depicted, some terminals TC are equipped with an embedded application AT that may generate application notifications intended for end-users (and more specifically, for their terminals). However, the invention also pertains, as depicted, to shared network applications AR which are generally installed in the network's RC servers in order to offer services to a multitude of terminals TC and/or to network devices. Any type of application that generates application notifications is concerned by the invention. Thus, one may cite, in a non-exhaustive and non-limiting fashion, media applications (such as the transmission of targeted advertising messages, or the transmission of news), medical alert applications (such as alerts giving reminders that a medication must be taken or that a treatment must be made ("e-health") or special emergency assistance), and business-related applications (such as transmitting financial, commercial, or technical information). These applications may, for example, use SOAP (Web services), SIP (Session Initiation Protocol), or PAP (Push Access Protocol) interfaces, or any other type of interface, in order to transmit application notification requests to the server SR.

In the non-limiting example depicted, the SR comprises an inventive processing device D, which will be described below. However, such a device D may be external to the server SR and connected thereto.

An inventive processing device D comprises at least a processing module MT tasked with intervening every time that the server SR receives from an application AT or AR an application notification NT which is intended for at least one user. An application notification NT includes parameters as well as content which must be used by each recipient terminal TC, taking into account said associated parameters.

During each intervention, the processing module MT analyzes the application notification NT that was received, in order to first determine adaptation information which are intended to define, firstly, how and at what time the content of the application notification NT must be transmitted to a chosen terminal TC of each recipient user, and secondly, which portion of that content must be used by each chosen terminal TC, and thirdly, how this portion must be used by each chosen terminal TC.

This determination is made depending on the chosen rule(s) and policy(-ies) and taking into account user information IU and/or contextual information IC and/or parameters contained within the application notification NT and/or chosen characteristics CT of the chosen terminal TC.

Whenever the processing module MT has finished determining adaptation information, it then adapts the application notification to be transmitted based on this adaptation information.

The aforementioned rules and/or policies pertain either to users considered individually, or to users belonging to a group of users.

These rules and/or policies define, for each user or group of users, and for each listed situation (defined by a type of terminal to be used, a type of application, a type of transmission infrastructure RC to use, a type of user profile or user group profile, and potentially at least one type of user or user group limitation (such as a handicap), and a type of user or user group context IC), a set of application notification adaptation(s) to make.

Here, "application notification adaptation" refers to adding term(s) of use to an application notification, after having potentially determined which parameters it is missing, in order to restrict each of that application notification's recipient terminals TC to use at a given moment ("when") and in accordance with the chosen terms of use ("how") at least one portion of that application notification's content ("what").

As a reminder, an application notification is defined by a known number of parameters, which, for some of them, may be "complex" because they define at least two "simple" parameters. In other words, some application notifications, called low-level, include only simple parameters and therefore do not need to be completed by other simple parameters, except for those which are added during the adaptation phase, and other application notifications, called high-level, include both simple parameters and complex parameters and therefore need for the latter to be replaced with their respective combinations of simple parameters, in addition to the added parameters.

Two examples of high-level application notifications, related to individual users, are given below:

[From: VOD-CIE, To: Bob, Content: "new VoD on surfing", Priority: INFORMATIONAL], which means that a video-on-demand application is telling Bob that a piece of multimedia content in the form of a video about surfing is available on demand, and that the application notification has an informational level of priority;

[From: Dr Peter, To: Alice, Content: "Take your medicine", Priority: URGENT], which means that a medical alert application is telling Alice, upon the request of her physician (Dr. Peter), then she must (immediately) take her medicine, and that the application notification has an urgent level of priority.

An example high-level application notification, related to a group of users, is given below:

[From: Dr Peter, To: Hospital service, Content: "Help needed", Priority: URGENT], which means that a medical alert application is telling a hospital service that Dr. Peter needs immediate help, and that the application notification has an urgent level of priority.

By way of a non-limiting example, and as depicted, the rules and/or policies relating to users may be stored within a first storage means B1, and the rules and/or policies relating to groups of users may be stored within a second storage means B2.

These first B1 and second B2 storage means may be in any form whatsoever. Consequently, they may be memories or databases. The first B1 and second B2 storage means may potentially constitute two parts of the same storage means.

It should be noted that in the non-limiting example depicted, the processing module PM comprises a first submodule ST1 dedicated to the adaptive processing of application notifications intended for a single user, and a second submodule ST2 dedicated to the adaptive processing of application notifications intended for groups of users.

The first submodule ST1 comprises, for example, the first storage means B1, and a first application notification adaptation module MA1, coupled to one another.

The second submodule ST2 comprises, for example, the second storage means B2, and a second application notification adaptation module MA2, coupled to one another.

The first application notification adaptation module MA1 intervenes, for example, once its first submodule ST1 has determined the terminal TC to which the content of a received application notification intended for its user must be transmitted, and at which moment that content must be transmitted, based on received information (IU, IC and CT). This available information may particularly include:

- the information IU related to the recipient user and/or the user who originated the application notification, such as, for example, the profile (preference(s)) of the recipient user, the profile (preference(s)) of the user who originated the application notification, or at least one limitation (such as a handicap) on the use of content related to the recipient user (such as a vision or hearing impairment),
- the contextual information IC related to the recipient user and/or his or her chosen terminal TC, such as, for example, information related to the presence of the recipient user near one of his or her terminals TC, information related to the geographic position of the recipient user, information related to the state in which each terminal TC of the recipient user is found, or information indicating the type of multimedia content which is being played by one of the recipient user's terminals TC,
- the parameters contained within the application notification NT, such as the level of priority, the level of criticality, the level of confidentiality, or the semantics of the content to be transmitted,
- the chosen characteristics CT of the chosen terminal TC, such as, for example, the content format that it supports, the save capacity that it supports, or the dimensions of its display screen. These characteristics CT are, for example, provided by a gateway RA comprised within the server SR. This gateway PA is intended to provide the processing module MT with the characteristics of the terminals TC, and to generate messages containing application notifications in accordance with the format of the chosen transmission channel (instant messaging (or IM), e-mail, telephone calls, SMS, MMS, and similar ones). It should be noted that the gateway PA may generate the characteristics of the terminals TC in a centralized fashion. This means that it may have a central database storing the characteristics of the terminals, updated automatically (such as via the UpnP (Universal Plug and Play) protocol, which makes it possible to automatically discover the characteristics of terminals which are connected within a network), or manually, in the case of non-UPnP terminals. For non-UPnP terminals, the gateway PA may, for example, provide the processing module MT with the characteristics of the terminals TC with the help of universal WURFL files (Wireless Universal Resource File—files in XML format listing all the characteristics of multiple mobile terminals (more than 5000 to date), updated regularly by the mobile terminal manufacturers).

The terminal TC that is chosen is the one which is best-suited given the available information received and information stored in the first storage means B1.

Likewise, the moment of transmission that is chosen is the one which is best-suited given the available information received and information stored in the first storage means B1. This moment, which is best-suited to the transmission of the adapted application notification may, for example, correspond to immediate transmission, or transmission which is delayed until the chosen terminal TC has finished playing a current piece of multimedia content, or transmission which is delayed until a chosen moment in a piece of multimedia content that is currently being played within a chosen terminal TC.

The intervention of the first application notification adaptation module MA1 consists of adapting the received application notification NT based on the received available information IU, IC, and CT, the chosen terminal TC, the determined moment of transmission, and the rules and/or policies which are stored in the first storage means B1.

As indicated above, this adaptation is intended to impose specific terms of use for the content of the adapted application notification onto the chosen terminal TC. The possible and potentially combinable terms of use may include:

- the use of a chosen portion or all of the content of the application notification,
- the momentary interruption (pause mode with later resumption (or "time-shifting")) of the playing of a piece of multimedia content in order to use the chosen portion of the content (or all of the content),
- in the presence of text content, the text-to-sound (audio) conversion of the chosen portion of said content (or its entirety). This may, for example, be decided based on the vision impairment or preference(s) of the recipient user,
- in the presence of sound content (audio), the sound-to-text conversion of the chosen portion of said content (or its entirety). This may, for example, be decided based on the hearing impairment or preference(s) of the recipient user,
- in the presence of sound (audio) or text content, the conversion of the content from a first language into a second language,
- the issuing of an audible alert signal (or "beep") to signal that the application notification has been received,
- a special display of the chosen portion of the content (or all of the content).
- the implementation of interactivity, such as for an application notification with an informational level of priority or one which requires the sending of an acknowledgment of receipt.

The second application notification adaptation module MA2 intervenes, for example, once its second submodule ST2 has determined which group of users must be sent the content of a received group application notification, and which strategy must be used to transmit this content to the group in question, based on information stored within a third storage means B3 (for example a memory or database), rules and/or policies stored within a second storage means B2, and potentially receive information (IU, IC, and CT) of the type described above.

The information stored in the third storage means B3 (which may potentially form part of the device D or the server SR) may include the role played by each user within his or her user group and all the other information about the user groups, which may potentially be provided by other systems.

For a group, the terminals TC which are chosen are those which are assumed to be available and best-suited, and the moment of transmission which is chosen for each terminal TC is that which is best suited given the received available information which pertains to it and the information stored in the third storage means B3.

It should be noted that the second submodule ST2 may choose the same moment of transmission for all the terminals of a group's users (this is called "simultaneous" transmission), or successive moments of transmission (this is called "sequential" transmission). It may also decide that the adapted application notification may only be transmitted to some of a group's users, for example given their respective roles and that application notification's level of priority, and/or decide to send the adapted application notification to the next recipient user in the group if and only if the previous recipient user within that same group did not acknowledge the adapted application notification after a timeout.

The intervention of the second application notification adaptation module MA2 consists of determining how and in what order each user in the group will be notified, and of adapting the received application notification NT based on the role of each user within the group, the rules and/or policies which are stored in a second storage means B2, and received available information IU, IC, and CT.

As indicated above, this adaptation is intended to impose specific terms of use for the content of the adapted application notification upon the chosen terminals TC. The terms of use may be similar to those which are described above for an application notification intended for a single user.

It should be noted that the application notification adaptations are preferentially made based on application notification templates which depend upon the applications that generate them and/or the types of transmission infrastructure which are used to transmit them to the terminals TC of the recipient users. To that end, and as depicted in the sole FIGURE, the processing module MT may comprise a storage means MN (for example, a memory), coupled to its submodules ST1 and ST2, in which are stored the various application notification templates, such as in the form of ontology files (OWL) or XML files.

As depicted in the sole FIGURE, the inventive device D may comprise a control module MCU tasked with applying the adaptation decisions made by the processing module MT, with delivering the application notifications adapted by the processing module MT to the terminals TC, with ensuring that the adapted application notifications have indeed been transmitted to the recipient terminals TC, and with ensuring that these terminals have used the content of the adapted application notifications in accordance with the terms of use defined by their parameters.

Furthermore, this control module MCU is preferentially configured so as to store all the application notifications sent and/or to be sent (once adapted) to the terminals TC within a fourth storage means B4, such as for queuing, logging, and/or billing purposes.

Furthermore, this control module MCU is preferentially also configured so as to manage the interactions coming from end-users.

As depicted, this control module MCU is, for example, installed between the processing module MT and the gateway PA and may be subdivided into two control submodules MC1 and MC2.

The first control submodule MC1 is, for example, tasked with delivering the application notifications to the terminals TC at the moment and in the form which have been decided by the processing module MT, to check whether the adapted application notifications were indeed transmitted to the recipient terminals TC, to ensure that these terminals did use their content in accordance with the terms of use defined by their parameters, and to re-send adapted application notifications if need be. It is also tasked with storing all of the received adapted application notifications (sent and to be sent to the terminals TC) within the storage means B4.

The second control submodule MC2 is, for example, tasked with managing the interactions which may be triggered by a recipient terminal TC subsequent to the use of a portion of application notification content and/or to an action from its user. For example, a piece of application notification content that has been made interactive may enable a user to access, or load, a webpage with his or her terminal TC, or to route him or her to an application (such as in order to establish communication, were to record an appointment, or to trigger the sending of a notification).

The server SR may be connected to other platforms, thereby making it possible to route users' requests to the platform managing a requested service. For example, a notification may be sent to a user accompanied by a "Call" button which enables him or her to call the sender. If so, whenever the user clicks on this button, the second control submodule MC2 receives the user's request and sends it to the telephone platform. To do so, it is sufficient for the second control submodule MC2 to have a customer interface to each service platform from which the server SR is acting as a relay.

The inventive processing device D, and particularly its processing module MT and potentially its control module MCU, may be constructed in the form of electronic circuits, software (or computing) modules, or a combination of circuits and software.

The invention is not limited to the embodiments of the processing device and server described above, which are only given by way of example; rather, it encompasses all variants that a person skilled in the art may envision within the framework of the claims below.

The invention claimed is:

1. A device for processing application notifications to be transmitted to users' communication terminals via at least one transmission infrastructure, the device comprising:
a hardware processor configured, whenever a given application notification intended for at least one user is received, to evaluate the criticality and the priority of the given application notification with respect to the recipient so as to:
determine adaptation information which defines i) how and at what time the given application notification's content must be transmitted to a chosen terminal of at least one recipient user, ii) what portion of the content must be used by the chosen terminal, iii) how the portion must be used by the chosen terminal, and iv) what the behavior of the chosen terminal will be when displaying the information, based on at least one chosen rule or policy and taking into account user information, contextual information relating to the chosen terminal, the semantic of the given application notification's content and characteristic of the chosen terminal, and adapt the given application notification to be transmitted based on the determined adaptation information.

2. A device according to claim 1, wherein the processor is configured to, whenever a group application notification intended for a group of users is received, evaluate the criticality and priority of the group application notification with respect to the recipients so as to:

determine adaptation information which defines i) how and at what time the group application notification's content must be transmitted to terminals of the recipient users of the group, ii) what portion of the content must be used by the users' terminals, iii) how the portion must be used by the users' terminals, depending on chosen rule or policy, and iv) what the behavior of the chosen terminal will be when displaying the information, and taking into account user information, a semantic of the group application notification's content, characteristic of the users' terminals and a role played by each user within the group, and adapt the group application notification to be transmitted based on the determined adaptation information.

3. A device according to claim 2, wherein the processor is configured to determine, whenever the group application notification intended for the group of users is received, a piece of adaptation information defining a mode or strategy for transmitting a group application notification which is chosen from a group consisting of one simultaneous transmission and one full or restricted sequential transmission.

4. A device according to claim 3, wherein the full or restricted sequential transmission is based on a role of at least one user in the group and on an acknowledgement of the adapted application notification by one of the group's members.

5. A device according to claim 2, wherein the processor is configured to determine, whenever the group application notification intended for the group of users is received, a piece of adaptation information defining the requirements of the successful delivery of the group application notification.

6. A device according to claim 2, comprising a controller configured to i) apply adaptation decisions made by the processor, and ii) deliver the group application notifications adapted by the processor according to the determined transmission mode or strategy.

7. A device according to claim 1, wherein each piece of user information is chosen from a group consisting of a recipient user's profile, a profile of a user or an application who originated the application notification, and at least one limitation on use of content related to the recipient user.

8. A device according to claim 1, wherein each piece of contextual information relates to the recipient user's chosen terminal and is chosen from a group consisting of a piece of information relating to a piece of multimedia content currently being played by a terminal of the recipient user.

9. A device according to claim 1, wherein each terminal characteristic is chosen from a group consisting of a supported content format, a supported storage and memory capacity, input and output capabilities, and display screen dimensions.

10. A device according to claim 1, wherein the processor is configured to choose a terminal of the at least one recipient user which is best-suited to the portion of content to be used.

11. A device according to claim 1, wherein the processor is configured to choose a moment which is best suited for the transmission of the application notification from among immediate transmission, transmission delayed until an end of a playing of a piece of multimedia content by a terminal of the recipient user, and transmission delayed until a chosen moment during the playing of a piece of multimedia content by a terminal of the recipient user.

12. A device according to claim 1, wherein the processor is configured to, whenever an application notification is received in which at least one parameter defining a term of use of at least one portion of content of the application notification is missing, i) determine each missing definition parameter depending on other parameters and chosen rule or policy and taking into account user information relating to the chosen terminal, the application notification's parameter and characteristic of the chosen terminal, and ii) adapt the application notification to be transmitted by adding each determined definition parameter to the application notification.

13. A device according to claim 12, wherein each term of use for a content portion is selected according to the criticality and priority of the content and covers (i) the adaptation of the content portion itself and (ii) the adaptation of the terminal behavior.

14. A device according to claim 13, wherein (i) the adaptation of the content portion is chosen among (but without being limited to) the translation from a first language into a second language or the rendering of the displayed message, and (ii) the adaptation of the terminal behavior is chosen among (but without being limited to) issuing an audible alert or triggering the terminal time-shift capacity to display the notification while interrupting the playing of a piece of multimedia content.

15. A device according to claim 1, comprising a controller configured to i) apply adaptation decisions made by the processor, ii) deliver application notifications adapted by the processor to the terminals, and iii) ensure that the recipient terminals have used the contents of the adapted application notifications in accordance with the terms of use defined by parameters of the adapted application notifications.

16. A device according to claim 15, wherein the controller is configured to manage at least one interactive operation triggered within a chosen terminal subsequent to the use of a portion of an adapted application notification's content.

17. A device according to claim 1, wherein the at least one chosen rule or policy defines at least one application notification adaptation to make.

18. A device according to claim 1, wherein the criticality and priority of the given application notification is computed by taking into account the semantic of the notification, the profile of the sender and the profile of the receiver.

* * * * *

UNITED STATES PATENT AND TRADEMARK OFFICE
CERTIFICATE OF CORRECTION

PATENT NO. : 8,560,632 B2  
APPLICATION NO. : 12/678355  
DATED : October 15, 2013  
INVENTOR(S) : Kamga et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this  
Eleventh Day of August, 2015

Michelle K. Lee  
*Director of the United States Patent and Trademark Office*